United States Patent
Montierth et al.

(10) Patent No.: US 7,248,381 B2
(45) Date of Patent: Jul. 24, 2007

(54) POINT-OF-SALE DEMONSTRATION OF COMPUTER PERIPHERALS

(75) Inventors: Mark D. Montierth, Meridian, ID (US); Richard D. Taylor, Eagle, ID (US); Gary Zimmerman, Boise, ID (US)

(73) Assignee: Avago Technologies Imaging IP (Singapore) Pte. Ltd., Singapore (SG)

( * ) Notice: Subject to any disclaimer, the term of this patent is extended or adjusted under 35 U.S.C. 154(b) by 1096 days.

(21) Appl. No.: 09/903,201

(22) Filed: Jul. 10, 2001

(65) Prior Publication Data

US 2003/0011807 A1    Jan. 16, 2003

(51) Int. Cl.
    *G06F 13/00*    (2006.01)
(52) U.S. Cl. .................. 358/1.15; 375/257; 455/559
(58) Field of Classification Search ............... 358/1.15, 358/1.6; 348/207.2; 713/322; 400/61; 361/827; 375/257; 455/559
    See application file for complete search history.

(56) References Cited

U.S. PATENT DOCUMENTS

| | | | |
|---|---|---|---|
| 5,729,204 A | | 3/1998 | Fackler et al. |
| 5,872,945 A | * | 2/1999 | Wett .................. 710/315 |
| 5,930,553 A | | 7/1999 | Hirst et al. |
| 5,978,943 A | | 11/1999 | Narukawa |
| 6,042,278 A | * | 3/2000 | Spencer et al. .............. 400/61 |
| 6,113,208 A | | 9/2000 | Benjamin et al. |
| 6,134,669 A | * | 10/2000 | Farago et al. ................ 713/322 |
| 6,370,603 B1 | * | 4/2002 | Silverman et al. ............ 710/72 |
| 6,438,643 B1 | | 8/2002 | Ohara et al. |
| 6,538,762 B1 | | 3/2003 | Terashima et al. |
| 6,665,089 B1 | | 12/2003 | Austin et al. |
| 6,747,752 B1 | * | 6/2004 | Farago ...................... 358/1.15 |
| 6,753,903 B1 | * | 6/2004 | Lin .......................... 348/207.2 |
| 6,799,157 B1 | * | 9/2004 | Kudo et al. .................. 703/28 |

OTHER PUBLICATIONS

Newton's Telecom Dictionary, Mar. 2004, CMP Books, Twentieth Edition, p. 337.*
Co-pending U.S. Appl. No. 09/675,194, filed on Sep. 29, 2000.

* cited by examiner

*Primary Examiner*—King Y. Poon

(57) ABSTRACT

A demonstration system for a peripheral such as a printer connects an external, non-volatile memory to the printer in place of the host computer. One such peripheral uses a peripheral cable containing a controller or formatter that includes a computer interface for communications with the host computer and an interface for memory accesses. The peripheral cable connects to the computer interface for communications with the host computer. The demonstration system employs a controller or formatter of the same type as used in the peripheral cable and connects the interface for reading from the external memory. The controller can load both demonstration code and demonstration data from the external memory and direct the peripheral to perform a demonstration.

15 Claims, 2 Drawing Sheets

POINT-OF-SALE DEMONSTRATION OF COMPUTER PERIPHERALS

BACKGROUND

A customer buying a computer peripheral such as a printer, a monitor, or a speaker system often wants to see a demonstration of the peripherals' capabilities. In particular, when choosing a printer, a customer is generally interested in the print quality, the speed of print operations, and the noise the printer makes. A customer could rely on pre-printed pages and a specification sheet as indications of the printer's capability, but the customer may be skeptical of the pre-printed material and may be unwilling to purchase a printer without seeing the printer in action. Accordingly, there is a general need for point-of-sale demonstrations of computer peripherals.

One technique for providing printer demonstrations is to include in a printer non-volatile memory that stores one or more demonstration pages and control circuitry for accessing and printing the stored demonstration pages at a customer's request. However, implementing the necessary control circuitry and memory for demonstrations adds cost to each printer without a corresponding improvement in performance.

Another technique for providing demonstrations is to connect a printer to a computer that controls the printer. This technique is often impractical at the point of sale because of the cost associated with having a computer dedicated to controlling printer demonstrations and technical complexities of controlling a large number of printers of different types. Additionally, customers typically would need to ask for help when activating the demonstration, and the complexity of the demonstration might present the printer unfavorably.

Yet another technique for providing printer demonstrations without burdening each printer with additional hardware is to construct a demonstration server having the minimum capabilities required to operate the printer. A demonstration server is basically a compact computer capable of little more than sending print images to printer. A disadvantage of constructing a demonstration server is the cost and development effort required to design the demonstration server, which is not a commercial product. The operation of the demonstration server can be simpler than a conventional computer operating a printer, but generally, the demonstration server would still require a separate power supply and space in the stores selling the printers.

A method for demonstrating the capabilities of a computer peripheral at the point of sale is desired that does not increase the cost of each peripheral, does not require significant design effort for production of a demonstration server that is not a commercial product, and does not require complex control systems, a power supply, or space at the point of sale.

SUMMARY

In accordance with an aspect of the invention, a host-based peripheral that normally relies on a host computer for data is instead connected to an external memory containing demonstration data and downloads the demonstration data from the external memory for a demonstration. Accordingly, the external memory replaces the host computer as a data source so that demonstrations do not require a host computer. Additionally, the external memory and other elements required for demonstrations are not part of the host-based peripheral so that the manufacturing cost of each peripheral is not increased to add demonstration capabilities.

In one embodiment of the invention, the host-based peripheral is a printer that has a controller integrated in a printer cable. During normal operation of the printer, the printer cable is connected between a host computer and the printer, and the controller in the cable formats signals from the host printer as required for the printer. For a demonstration, a demonstration cable replaces the printer cable. The demonstration cable contains substantially the same elements as the printer cable but has a non-volatile memory such as an EEPROM connected in place of the host computer. The controller in the demonstration cable reads from the non-volatile memory to obtain demonstration data and formats the demonstration data for printing.

Development of a demonstration cable in accordance with the invention is relatively simple and inexpensive particularly when the controller for the printer cable has an interface capable of accessing firmware or other data from non-volatile memory. In such cases, the demonstration cable can use the non-volatile memory interface where the printer cable uses the interface circuitry that communicates with the host computer. Additionally, the demonstration cable uses the electronics and enclosures required for the printer cable, which eliminates the need to design electronics or enclosures for the demonstration cable. Further, the demonstration cable can use power from the printer for operation, eliminating the need for a separate external power supply.

BRIEF DESCRIPTION OF THE DRAWINGS

Use of the same reference symbols in different figures indicates similar or identical items.

DETAILED DESCRIPTION

In accordance with an aspect of the invention, a demonstration of a host-based peripheral such as a printer, a video monitor, or speakers uses an external non-volatile memory in place of the host computer that would be required for normal operation of the host-based peripheral. The invention is particularly well suited for a peripheral employing a cable containing active logic such as a controller. In such embodiments, a demonstration cable that permits demonstrations of the peripherals capabilities can be easily designed by attaching external memory in place of a host computer and modifying the regular-use cables to download data from the external memory instead of the host computer.

Figure 1:
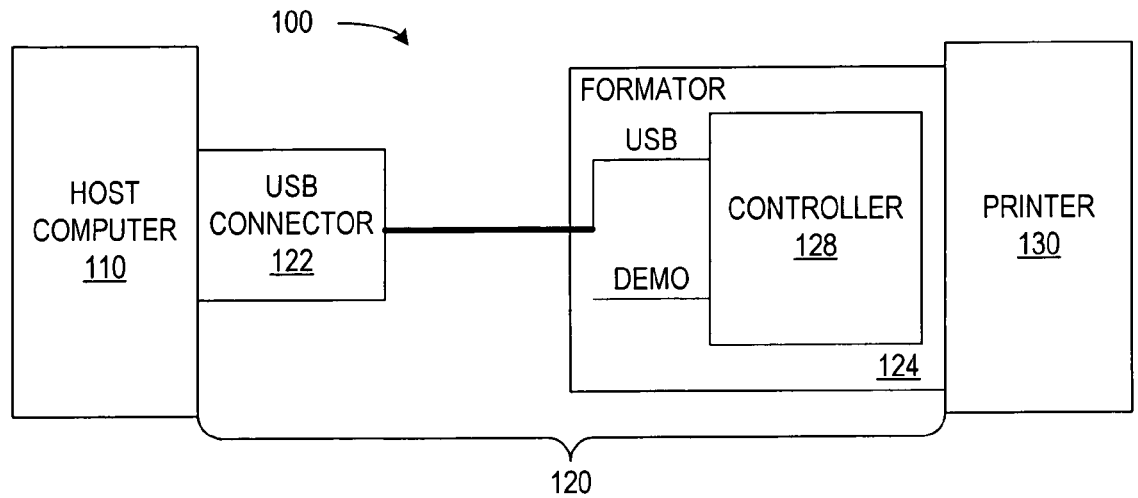
FIG. 1 illustrates a system in which a printer cable connects a printer to a host computer for normal operation of the printer.

FIG. 1 illustrates a system 100 including a host computer 110 and a host-based peripheral that is a printer 130. A printer cable 120 that connects host computer 110 to printer 130 includes a controller 128 that acts as a formatter 124. In particular, controller 128 receives data from host computer 110 and formats the data as required for printer 130. An advantage of including a controller such as controller 128 in a cable is that printer 130 does not required hardware for multiple alternative computer interfaces.

In the illustrated embodiment, printer cable 120 has a universal serial bus (USB) connector 122 that connects to a standard USB port of host computer 110, and controller 128 contains an interface circuit that implements standard USB data transmissions. Although use of a USB interface has the advantages of providing a controlled impedance and requiring relatively low cost cables or wires, other computer interfaces are also suitable. Alternative printer cables can be implement, for example, for connection to a parallel port of host computer 110 or any desired interface of host computer 110.

Figure 2:
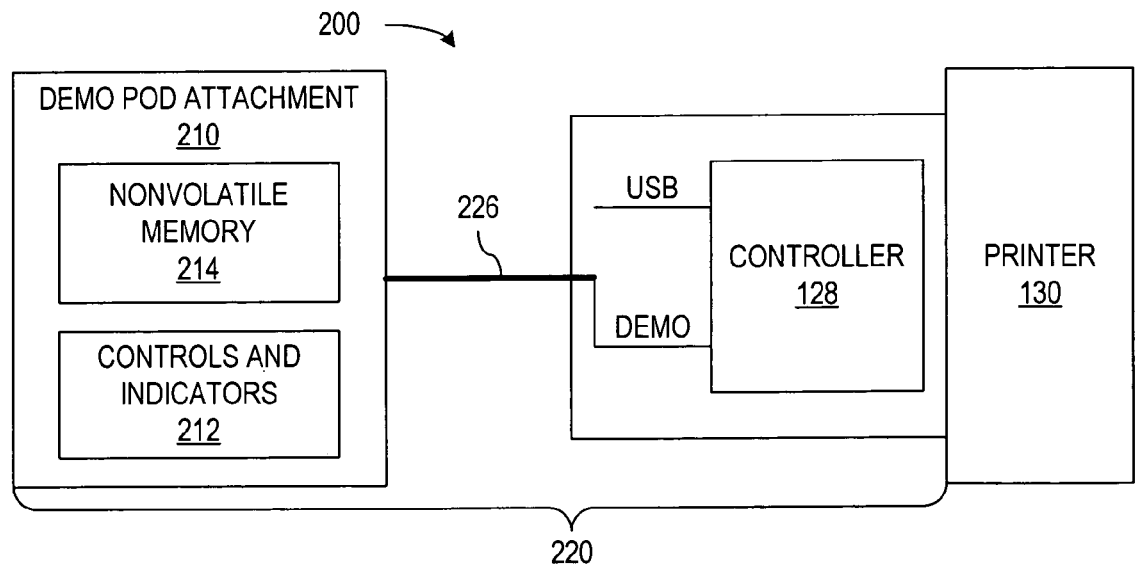
FIG. 2 shows illustrates a system in accordance to an embodiment of the invention in which a demonstration cable is connected to the printer of FIG. 1 to permit demonstration of the printer's capabilities without the need of a host computer.

FIG. 2 shows a system 200 in which a demonstration cable 220 is connected to printer 130 of FIG. 1. Demonstration cable 220 includes a demo pod 210 that is connected to controller 128. In alternative embodiments, demo pod 210 can be part of a molded cable including controller 128 and demo pod 210, or demo pod 210 can be a separate device capable of receiving USB connector 122 or such connector as may be provided at a host end of leads 226.

Demo pod 210 includes controls and indicators 212 and a non-volatile memory 214. Controls and indicators 214 typically include status lights or LEDs that indicate the status of demo pod 210 and one or more switch that a user operates to select or begin a demonstration of printer 130. As an alternative to including controls and indicators in demo pod 210, printer 130 can be configured so that buttons or other hardware in printer 130 can activate a demo operation and display the status of the demonstration.

Non-volatile memory 214 contains demonstration data that controller 128 downloads for the demonstration of printer 130. Many suitable types of non-volatile memory ROM, EPROM, Flash memory, and EEPROM are known in the art. The exemplary embodiment of the invention uses a serial EEPROM for non-volatile memory 214 because demonstration data is easily stored in the serial EEPROM and controller 128 can be designed to use serial memory devices for other purposes such as debugging and system diagnostics.

The interface and protocols for communication between controller 128 and nonvolatile memory 214 generally differ from the interface and protocols required for communications between controller 128 and host computer 110 (FIG. 1). Accordingly, demonstration cable 220 provides different connections to controller 128. In particular, instead of connections to a USB interface of controller 128 as in printer cable 120 of FIG. 1, demonstration cable 220 has leads 226 connected to a memory or general purpose I/O (GPIO) port of controller 128. The GPIO port can have other uses in controller 128. For example, circuitry for the GPIO port of controller 128 can also implement an interface to internal or external memory (not shown) that controller 128 uses for downloading firmware or other data of for diagnostics.

Figure 3:
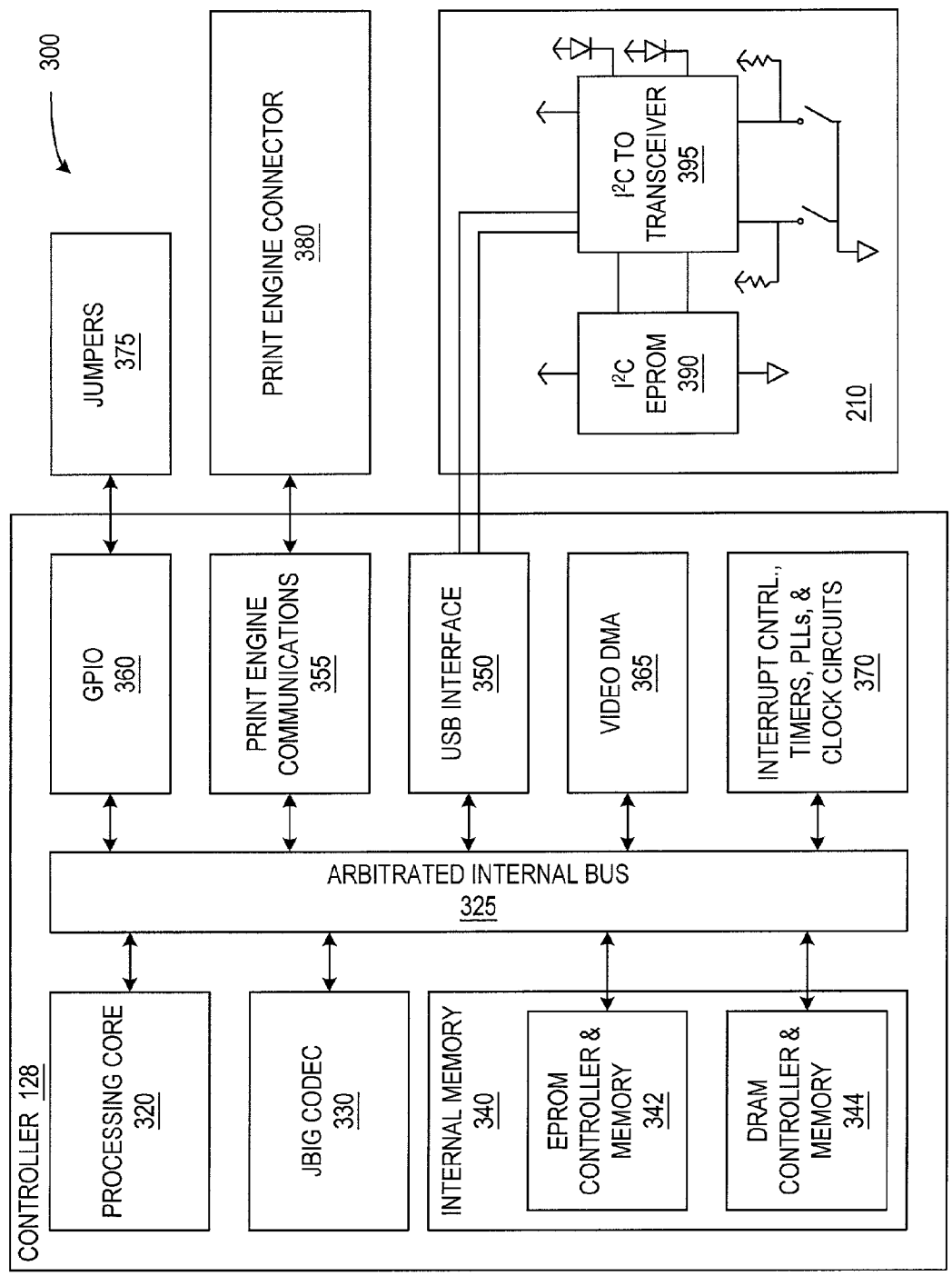
FIG. 3 is a block diagram of a demonstration cable in accordance with an exemplary embodiment of the invention.

FIG. 3 is a block diagram of an exemplary embodiment of a demonstration cable 300, which includes an integrated circuit controller 128 and a demo pod attachment 210. In this embodiment, controller 128 includes a processing core 320, a codec 330, internal memory 340, a USB interface 350, a print engine communication interface 355, a general purpose input/output (GPIO) interface 360, a video DMA unit 365, and timing circuits 370 that communicate with each other via an arbitrated internal bus 325.

Processing core 320 is a general-purpose processor such as an ARM7 and is operable in a normal mode and a test mode. In the normal mode, processing core 320 boots up using code from internal memory 340 (and particularly via EPROM controller and memory 342. Normal mode would typically be used when controller 128 is part of a printer cable, in which case, processing core 320 executes the code for starting up the printer and communication with the host computer. Video DMA 365 and USB interface 350 are for transfer of the printer data to internal memory 340 (i.e., to DRAM controller and memory 344) from the host computer via a USB bus.

In test mode, processing core 320 boots up from an external memory via GPIO 360. The boot up from external memory can be used to load code for debugging during development of controller 128, testing of controller 128 during manufacture, or system specific testing during start-up of controller 128.

In demonstration cable 300, jumpers 375, which are configured and connected to GPIO, interface 360 so that controller 128 operates in test mode. Demo pod 210 is also connected to GPIO interface 360 to provide data to processing core 320.

A printer connector 380 connects to print engine communication 355 in controller 128 and to demo pod 210 via a cable. The cable provides power from the printer to controller 128 and demo pod 210 and carries communications between controller 128 and the printer for demonstration print operations.

In the illustrated embodiment, demo pod 210 includes an I$^2$C EPROM 390, an I$^2$C-to-transceiver chip 395 such as a Philips PCF8575, and associated circuits such as control switches and status LEDs. During power up of a printer with demonstration cable 300 connected, controller 128 loads a firmware from I$^2$C EPROM 390. Processing core 320 when executing that firmware monitors the status of demo pod 210 and in response to activation of the demo pod's loads print data from I$^2$C EPROM 390 and directs the printer to perform a demonstration print operation based on the data.

Demonstration cable 300 has several advantages. In particular, demonstration cable 300 requires only a small amount of relatively inexpensive hardware and takes advantage of an interface 360 that serves other purposes in controller 128. Internal memory 340 of controller 340 is not burdened with firmware and demonstration data for demonstrations and accordingly can be smaller, and the printer is not burdened at all for demonstration capabilities. Additionally, the demonstration pod does not require a separate power supply that might be inconvenient at the point of sale.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. For a peripheral that during normal operation, connects to a host computer through a cable containing a controller, a demonstration system comprising:

a controller of a type employed in the cable that connects the peripheral to the host computer during normal operation; and a memory that is external to the peripheral, contains demonstration data, and is coupled to the controller to enable the controller to read the demonstration data from the memory for the peripheral to perform a demonstration without being connected to the host computer.

2. The demonstration system of claim 1, wherein the peripheral is a printer.

3. The demonstration system of claim 2, wherein:

the controller in the cable operates to format data from the host computer for a print operation of the printer; and the controller in the demonstration system operates to format data from the memory as required for the print operation of the printer.

4. The demonstration system of claim 1, wherein the demonstration system further comprises:
   a connector having a pin layout for connection to the printer;
   a first enclosure containing the controller; and
   a second enclosure containing the memory.

5. The demonstration system of claim 4, wherein the connector, the first enclosure, and the second enclosure are substantially identical to matching elements of the cable that connects the peripheral to the host computer during the normal operation.

6. The demonstration system of claim 1, wherein the memory is a non-volatile memory.

7. The demonstration system of claim 1, wherein the controller is operable in a first mode and a second mode, wherein in the first mode, the controller boots from an internal memory, and in the second mode, the controller boots from the external memory.

8. The demonstration system of claim 7, further comprising circuitry connected to the controller to cause the controller to operate only in the second mode.

9. The demonstration system of claim 7, wherein the external memory further comprises demonstration code that the controller executes.

10. The demonstration system of claim 1, wherein the external memory further comprises demonstration code that the controller executes.

11. A method of making a demonstration system for a printer, comprising the steps of:
   connecting to the printer a cable containing a controller that is of a type used in a printer cable that connects the printer to a host computer during normal operation of the printer;
   storing demonstration data in a memory; and
   connecting the memory to the cable to enable the controller to read the demonstration data from the memory and format the data for the printer.

12. The method of claim 11, wherein the controller has a computer interface and a memory interface, the computer interface is connected through the printer cable to the host computer during normal operation, and wherein connecting the memory comprises connecting the memory through the cable to the memory interface.

13. The method of claim 12, wherein the computer interface implements a protocol for serial communication with the host computer and the memory interface implements an interface for access in a non-volatile memory.

14. The method of 13, wherein the computer interface implements the protocol required for connection to a universal serial bus, and the memory interface implements accesses to a serial EEPROM.

15. The method of claim 12, wherein the memory interface comprises circuitry for access of non-volatile memory.

* * * * *